United States Patent
Choi et al.

(10) Patent No.: US 9,621,469 B2
(45) Date of Patent: Apr. 11, 2017

(54) APPARATUS AND METHOD FOR MANAGING FLOW IN SERVER VIRTUALIZATION ENVIRONMENT, AND METHOD FOR APPLYING QOS

(71) Applicant: Electronics and Telecommunications Research Institute, Daejeon-si (KR)

(72) Inventors: Kang-Il Choi, Daejeon-si (KR); Bhum-Cheol Lee, Daejeon-si (KR); Jung-Hee Lee, Daejeon-si (KR); Young-Ho Park, Daejeon-si (KR); Sang-Min Lee, Daejeon-si (KR); Seung-Woo Lee, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 394 days.

(21) Appl. No.: 14/079,272

(22) Filed: Nov. 13, 2013

(65) Prior Publication Data

US 2014/0160931 A1 Jun. 12, 2014

(30) Foreign Application Priority Data

Dec. 6, 2012 (KR) .................. 10-2012-0141374

(51) Int. Cl.
| | |
|---|---|
| *H04L 12/851* | (2013.01) |
| *H04L 12/801* | (2013.01) |
| *H04L 12/803* | (2013.01) |
| *H04W 28/08* | (2009.01) |
| *H04W 28/02* | (2009.01) |
| *H04L 12/26* | (2006.01) |

(52) U.S. Cl.
CPC .............. *H04L 47/24* (2013.01); *H04L 47/12* (2013.01); *H04L 47/125* (2013.01); *H04L 43/0882* (2013.01); *H04W 28/0289* (2013.01); *H04W 28/08* (2013.01)

(58) Field of Classification Search
CPC ...................................................... H04L 47/24
USPC .............................. 370/235, 329, 401, 230.1
See application file for complete search history.

(56) References Cited

U.S. PATENT DOCUMENTS

| | | | |
|---|---|---|---|
| 6,006,264 A | 12/1999 | Colby et al. | |
| 6,452,915 B1 * | 9/2002 | Jorgensen | H04L 1/20 370/328 |
| 6,597,699 B1 * | 7/2003 | Ayres | 370/400 |
| 6,674,756 B1 * | 1/2004 | Rao et al. | 370/395.21 |

(Continued)

*Primary Examiner* — Andrew Lai
*Assistant Examiner* — Andrew C Lee
(74) *Attorney, Agent, or Firm* — Kile Park Reed & Houtteman PLLC

(57) ABSTRACT

An apparatus and method for managing a flow in a server virtualization environment, and a method of applying a QoS policy, the method including a flow processing unit configured to analyze a flow generated by a virtual machine (VM) to extract flow information, determine whether the flow is a new flow by comparing the extracted flow information with preset flow information, and apply a corresponding Quality of Service (QoS) policy to the flow, and a QoS management unit configured to, in a case in which the flow is a new flow, generate a QoS policy for the analyzed flow based on the extracted flow information and prestored virtual machine information, and transmit the generated QoS policy to the flow processing unit.

18 Claims, 7 Drawing Sheets

(56) References Cited

U.S. PATENT DOCUMENTS

| | | | |
|---|---|---|---|
| 6,690,678 B1* | 2/2004 | Basso et al. | 370/468 |
| 7,430,741 B2* | 9/2008 | Ayachitula et al. | 718/104 |
| 7,466,703 B1* | 12/2008 | Arunachalam | H04L 45/00 370/351 |
| 7,711,789 B1* | 5/2010 | Jnagal et al. | 709/213 |
| 7,751,330 B2 | 7/2010 | Lee et al. | |
| 8,565,108 B1* | 10/2013 | Marshall | G06F 21/60 370/252 |
| 8,612,612 B1* | 12/2013 | Dukes | H04L 67/14 370/230 |
| 9,154,423 B1* | 10/2015 | Szabo | H04W 28/02 |
| 9,203,771 B1* | 12/2015 | Cai | H04L 47/621 |
| 9,256,509 B1* | 2/2016 | Rajagopal | G06F 11/3604 |
| 2002/0118644 A1* | 8/2002 | Moir | 370/230.1 |
| 2004/0090970 A1* | 5/2004 | Sanchez | H04L 12/18 370/397 |
| 2005/0175001 A1* | 8/2005 | Becker Hof | H04L 49/355 370/389 |
| 2005/0267986 A1* | 12/2005 | Murakami | H04L 67/1097 709/238 |
| 2007/0058632 A1* | 3/2007 | Back | H04L 12/2602 370/392 |
| 2007/0116051 A1* | 5/2007 | Chen | H04L 29/12924 370/469 |
| 2008/0025301 A1* | 1/2008 | Lenzini | H04L 12/5693 370/389 |
| 2008/0262990 A1* | 10/2008 | Kapoor | G06F 9/505 706/20 |
| 2009/0316711 A1* | 12/2009 | Memon | H04L 47/10 370/412 |
| 2010/0054129 A1* | 3/2010 | Kuik et al. | 370/235 |
| 2010/0257263 A1 | 10/2010 | Casado et al. | |
| 2011/0213869 A1* | 9/2011 | Korsunsky | G06F 21/55 709/223 |
| 2012/0099591 A1 | 4/2012 | Kotha et al. | |
| 2012/0106546 A1 | 5/2012 | Sinha | |
| 2012/0124229 A1* | 5/2012 | Sahu et al. | 709/228 |
| 2012/0127857 A1* | 5/2012 | Sundar et al. | 370/230.1 |
| 2012/0195187 A1* | 8/2012 | Ashihara | G06F 9/46 370/220 |
| 2012/0275328 A1* | 11/2012 | Iwata | H04L 69/324 370/252 |
| 2012/0303825 A1* | 11/2012 | Xie | H04L 29/12009 709/228 |
| 2012/0303835 A1* | 11/2012 | Kempf | H04W 24/02 |
| 2013/0041934 A1* | 2/2013 | Annamalaisami | H04L 43/026 709/203 |
| 2013/0064096 A1* | 3/2013 | Degioanni | H04L 67/1097 370/241 |
| 2013/0205376 A1* | 8/2013 | Narasimha | H04L 9/3247 726/6 |
| 2014/0068087 A1* | 3/2014 | Spencer, IV | H04L 47/26 709/227 |
| 2015/0033222 A1* | 1/2015 | Hussain | G06F 9/45533 718/1 |
| 2015/0040121 A1* | 2/2015 | Barabash et al. | 718/1 |
| 2015/0085868 A1* | 3/2015 | Snyder et al. | 370/401 |

* cited by examiner

APPARATUS AND METHOD FOR MANAGING FLOW IN SERVER VIRTUALIZATION ENVIRONMENT, AND METHOD FOR APPLYING QOS

CROSS-REFERENCE TO RELATED APPLICATION

This application claims the benefit under 35 U.S.C. §119 (a) of a Korean Patent Application No. 10-2012-0141374, filed on Dec. 6, 2012, in the Korean Intellectual Property Office, the entire disclosure of which is incorporated herein by reference for all purposes.

BACKGROUND

1. Field

The following description relates to technology for network virtualization, and more particularly, to an apparatus and method for managing a flow in a server virtualization environment, and a method for applying QoS.

2. Description of the Related Art

A server virtualization is technology for enabling a user to divide server resources in a single platform, such as a central processing unit (CPU), a memory, and input/output ports, by multiple domains or server applications. In a server virtualization environment, one or more different virtual machines and a hypervisor that manages the virtual machines may exist on a single server.

Meanwhile, with a network, multiple virtual machines installed on a single server commonly share one or more network devices. When the network device is shared by one or more virtual machines, each of the virtual machines needs to share the network without interfering with each other at a network level. Accordingly, there is a need for network virtualization technology capable of logically distinguishing between network traffic generated by one virtual machine and other network traffic generated by other virtual machines.

Examples of the network virtual technology may include a Layer 2 VLAN (Virtual Local Area Network) technology that is a virtualization technology based on a hardware. However, the Layer 2 VLAN technology has a limitation on the maximum number of supported virtual machines, and thus has difficulty in flexibly coping with the recent trend of having an increasing number of virtual machines and also has difficulty in connecting a network between virtual machines within a single hypervisor.

SUMMARY

The following description relates to an apparatus and method for managing a flow in a server virtualization environment and a method for applying a Quality of Service (QoS) is policy capable of ensuring a Quality of Service (QoS) in units of flows or virtual machines and supporting a multi-tenant by managing flows generated by virtual machines in units of flows or virtual machines according to virtual machine information and a QoS policy.

In one general aspect, an apparatus for managing a flow in a server virtualization environment includes a flow processing unit and a QoS management unit. The flow processing unit may be configured to analyze a flow generated by a virtual machine (VM) to extract flow information, determine whether the flow is a new flow by comparing the extracted flow information with preset flow information, and apply a corresponding Quality of Service (QoS) policy to the flow. The QoS management unit may be configured to, in a case in which the flow is a new flow, generate a QoS policy for the analyzed flow based on the extracted flow information and prestored virtual machine information, and transmit the generated QoS policy to the flow processing unit.

The virtual machine information may include one of an IP address of the virtual machine, a media access control (MAC) address of the virtual machine, network address translation (NAT) conversion information of the virtual machine, and a QoS requirement for a flow generated by the virtual machine.

The apparatus may further include a virtual machine management unit configured to manage the virtual machine and the virtual machine information.

The virtual machine management unit, in a case in which the virtual machine information is changed, may update corresponding virtual machine information stored in the QoS management unit.

The virtual machine management unit may generate an instruction signal to perform one of generation, change, deletion and transfer of a virtual machine, transmit the generated instruction signal to a server in which the virtual machine is included, and receive a result of is processing the instruction signal and changed virtual machine information from the server.

The QoS management unit may generate the QoS policy for the analyzed flow according to a QoS generation policy that is dynamically set.

The QoS generation policy that is dynamically set may be one of a QoS generation policy that is determined based on a user input, and a QoS generation policy that is determined based on the prestored virtual machine information.

The QoS management unit may generate the QoS policy for the analyzed flow according to a QoS generation policy that is statically set.

The QoS generation policy that is statically set may be one of a QoS generation policy that is set to equally divide ports and a QoS generation policy that is set to perform a Best Effort (BE).

In another general aspect, a method for managing a flow in a server virtualization environment includes receiving a flow generated by a virtual machine, extracting flow information by analyzing the received flow, determining whether the received flow is a new flow by comparing the extracted flow information with prestored flow information, generating, if determined that the received flow is a new flow, a QoS policy for the received flow based on the extracted flow information and prestored virtual machine information, and applying the generated QoS policy to the received flow.

In still another general aspect, a method for applying a QoS policy includes calculating bandwidth usages of all flows that are received through a network interface and exist in a flow management unit, adding up the calculated bandwidth usages and comparing a sum of the calculated bandwidth usages with a bandwidth of the network interface, detecting, if the sum of the bandwidth usages is greater than the bandwidth of the network interface, a virtual machine having a bandwidth usage greater than a bandwidth setting value among virtual machines that transmit flows through the network interface, detecting a flow having a bandwidth usage greater than a bandwidth setting value among flows generated by the detected virtual machine, and applying a corresponding QoS policy to the detected flow.

Other features and aspects will be apparent from the following detailed description, the drawings, and the claims.

Figure 1:
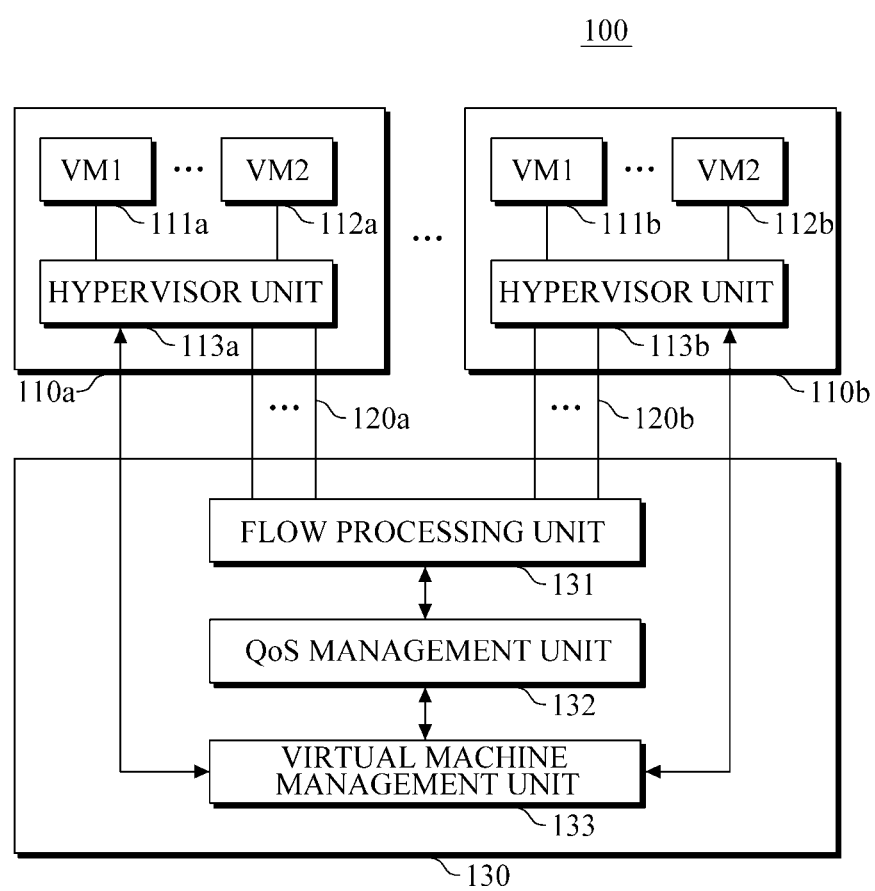
FIG. 1 is a block diagram illustrating a server virtualization system in accordance with an example embodiment of the present disclosure.

Throughout the drawings and the detailed description, unless otherwise described, the same drawing reference numerals will be understood to refer to the same respective elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness. In addition, while parts of the present invention are named and described below with reference to their functionalities, alternative terminology may be employed, as desired by a user, operator, or according to conventional practice, without altering the content of the disclosure.

FIG. 1 is a block diagram illustrating a server virtualization system in accordance with an example embodiment of the present disclosure.

Referring to FIG. 1, a server virtualization system 100 in accordance with an example embodiment of the present disclosure includes servers 110a and 110b and a flow management apparatus 130.

The servers 110a and 110b may include one or more virtual machines 111a, 112a, 111b and 112b, and hypervisor units 113a and 113b. Although not shown, the servers 110a and 110b may include physical hardware, for example, a central processing unit (CPU), a memory, a storage, and a network interface.

The virtual machines 111a, 112a, 111b and 112b represent software that operate on logical hardware provided by the hypervisor units 113a and 113, for example, a central processing unit (CPU), a memory, a storage, and a network interface. For example, the virtual machines 111a, 112a, 111b and 112b may be operating systems (OS) including Linux, NetBSD, FreeBSD, Solaris, and Windows.

Each of the virtual machines 111a, 112a, 111b and 112b may generate a flow according to a service that is provided from a corresponding one of the virtual machines 111a, 112a, 111b and 112b, for example, a web server, a file server, a video server, a cloud server, a business financing, a financing, and stocks. Each flow has a different Quality of Service (QoS) requirement depending on a service provided by each virtual machine.

The hypervisor units 113 and 113b may virtualize physical hardware, for example, a CPU, a memory, a storage, and a network interface, to generate logical hardware, for example, a virtual CPU, a virtual memory, a virtual storage, and a virtual network interface, and provide the generated logical hardware to the virtual machines 111a, 112a, 111b and 112b.

The hypervisor units 113a and 113b may directly perform a management function on a virtual machine, such as generating, changing, deleting and transferring a virtual machine, and a management function on resources of the servers 110a and 110b.

The flow management apparatus 130 receives the flows generated by the virtual machines 111a, 112a, 111b and 112b, and applies a corresponding QoS policy to the received flow. To this end, the flow management apparatus 130 may include a flow processing unit 131 and a QoS management unit 132.

The flow processing unit 131 is connected to the servers 110a and 110b through one or more network interfaces 120a and 120b, and receives the flows generated by the virtual machines 111a, 112a, 111b and 112b through the network interfaces 120a and 120b.

The flow processing unit 131 may extract flow information by analyzing the received flow, determine whether the received flow is a new flow based on the extracted flow information, and if determined that the received flow is a new flow, transmit the extracted flow information to the QoS management unit 132. The flow information may include protocols, an IP address of departure, a port of departure, an IP address of destination, a port of destination, total bytes, total packets and duration.

Meanwhile, the QoS management unit 132 having received the flow information may generate a Qos policy corresponding to the flow, and this will be described later in detail.

The flow processing unit 131 may receive a QoS policy from the QoS management unit 132, set the received QoS policy, and apply the QoS policy to the received flow. For example, the flow processing unit 131, if a received flow is a new flow, sets a QoS policy that is received from the QoS management unit 132 and applies the QoS policy to the flow, and if the received flow is an existing flow, applies a preset corresponding QoS policy to the flow.

The QoS management unit 132 receives the flow information from the flow processing unit 131, and generates a QoS policy for the flow according to a preset QoS generation policy, based on prestored virtual machine information and the received flow information. The virtual machine information may include an IP address of a virtual machine, an MAC address of a virtual machine, NAT conversion information of a virtual machine, and a QoS requirement for a flow generated by a virtual machine.

The QoS generation policy may be dynamically or statically set. For example, a QoS generation policy that is dynamically set may be one of a QoS generation policy determined based on a user input, and a QoS generation policy determined based on the prestored virtual machine information. A QoS generation policy that is statically set may be one of a QoS generation policy that is set to equally divide ports and a QoS generation policy that is set to perform a Best Effort (BE). However, the QoS generation policy is not limited thereto.

Meanwhile, in accordance with additional example embodiments of the present disclosure, the flow management apparatus 130 may further include a virtual machine management unit 133.

The virtual machine management unit 133, according to a user instruction or a policy of the system, may generate an instruction signal about virtual machine management to generate, change, delete and transfer the virtual machines 111a, 112a, 111b and 112b and an instruction signal about managing the resources of the servers 110a and 110b, and transmit the generated instruction signals to the hypervisor units 113a and 113b.

Meanwhile, the hypervisor units 113a and 113b having received the instruction signal from the virtual machine management unit 133 execute an instruction corresponding to the instruction signal and transmit a result of execution and changed virtual machine information to the virtual machine management unit 133.

The virtual machine management unit 133 may receive the virtual machine information from the hypervisor units 113a and 113b and transmit the received virtual is machine information to the QoS management unit 132 such that the virtual machine information is updated. The virtual machine information may include an IP address of a virtual machine, an MAC address of a virtual machine, NAT conversion information of a virtual machine, and a QoS requirement for a flow generated by a virtual machine.

Figure 2:
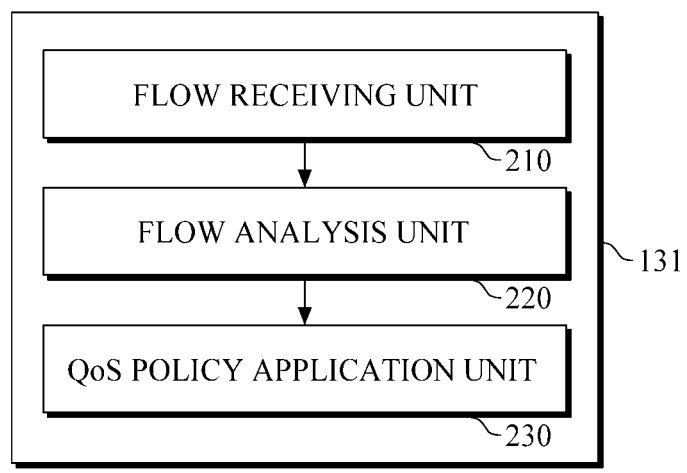
FIG. 2 is a detailed view of a flow processing unit 131 of FIG. 1.

FIG. 2 is a detailed view of the flow processing unit 131 of FIG. 1.

Referring to FIG. 2, the flow processing unit 131 includes a flow receiving unit 210, a flow analysis unit 220 and a QoS policy application unit 230.

The flow receiving unit 210 may receive flows generated by the virtual machines 111a, 112a, 111b and 112b. For example, the flow receiving unit 210 may receive flows generated by the virtual machines 111a, 112a, 111b and 112b through the one or more network interfaces 120a and 120b.

The flow analysis unit 220 may extract flow information by analyzing the received flow. The flow information may include protocols, an IP address of departure, a port of departure, an IP address of destination, a port of destination, total bytes, total packets and duration.

In addition, the flow analysis unit 220 may determine whether the received flow is a new flow or an existing flow based on the extracted flow information, and if determined that the received flow is a new flow, transmit the extracted flow information to the QoS management unit 132.

For example, the flow analysis unit 220 compares the extracted flow information with prestored flow information, thereby determining whether the received flow is a new flow or an existing flow. In this case, it is determined whether the received flow is a new flow or an existing flow by comparing protocols, an IP address of departure, a port of departure, an IP address of destination, and a port of destination. To this end, the flow processing unit 131 may further include a flow information storage (not shown) to store flow information, and the flow information storage (not shown) may store flow information of the received flow.

The QoS policy application unit 230 may receive and set a QoS policy generated by the QoS management unit 132, and apply a corresponding QoS policy to a received flow. For example, the QoS policy application unit 230, if a received flow is a new flow, may set a corresponding QoS policy that is received from the QoS management unit 132 and apply the QoS policy to the received flow, and if a received flow is an existing flow, apply a preset corresponding QoS policy to the received flow.

Figure 3:
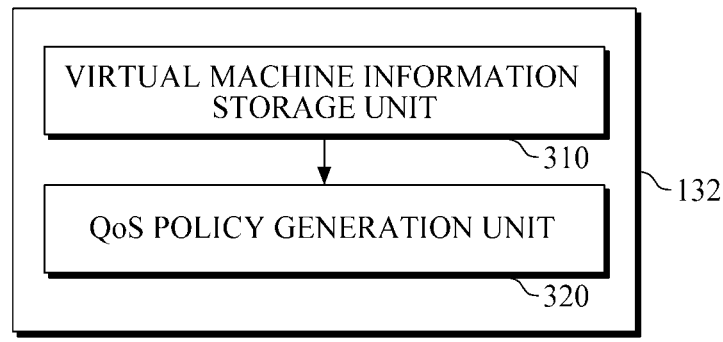
FIG. 3 is a detailed view of a QoS management unit 132 of FIG. 2.

FIG. 3 is a detailed view of the QoS management unit 132 of FIG. 2.

Referring to FIG. 3, the QoS management unit 132 may include a virtual machine information storage unit 310 and a QoS policy generation unit 320.

The virtual machine information storage unit 310 may store virtual machine information. For example, the virtual machine information storage unit 310 may receive virtual machine information from the virtual machine management unit 133 and store the received virtual machine information. The virtual machine information may include an IP address of a virtual machine, an MAC address of a virtual machine, NAT conversion information of a virtual machine, and a QoS requirement for a flow generated by a virtual machine.

The QoS policy generation unit 320 may generate a QoS policy according to a preset QoS generation policy, based on the flow information received from the flow processing unit 131 and the virtual machine information stored in the virtual machine information storage unit 310.

In this case, the QoS generation policy may be dynamically or statically set. For example, a QoS generation policy that is dynamically set may be a QoS generation policy determined based on a user input, or a QoS generation policy determined based on the prestored virtual machine information. A QoS generation policy that is statically set may be a QoS generation policy that is set to equally divide ports and a QoS generation policy that is set to perform a Best Effort (BE). However, the QoS generation policy is not limited thereto.

Figure 4:
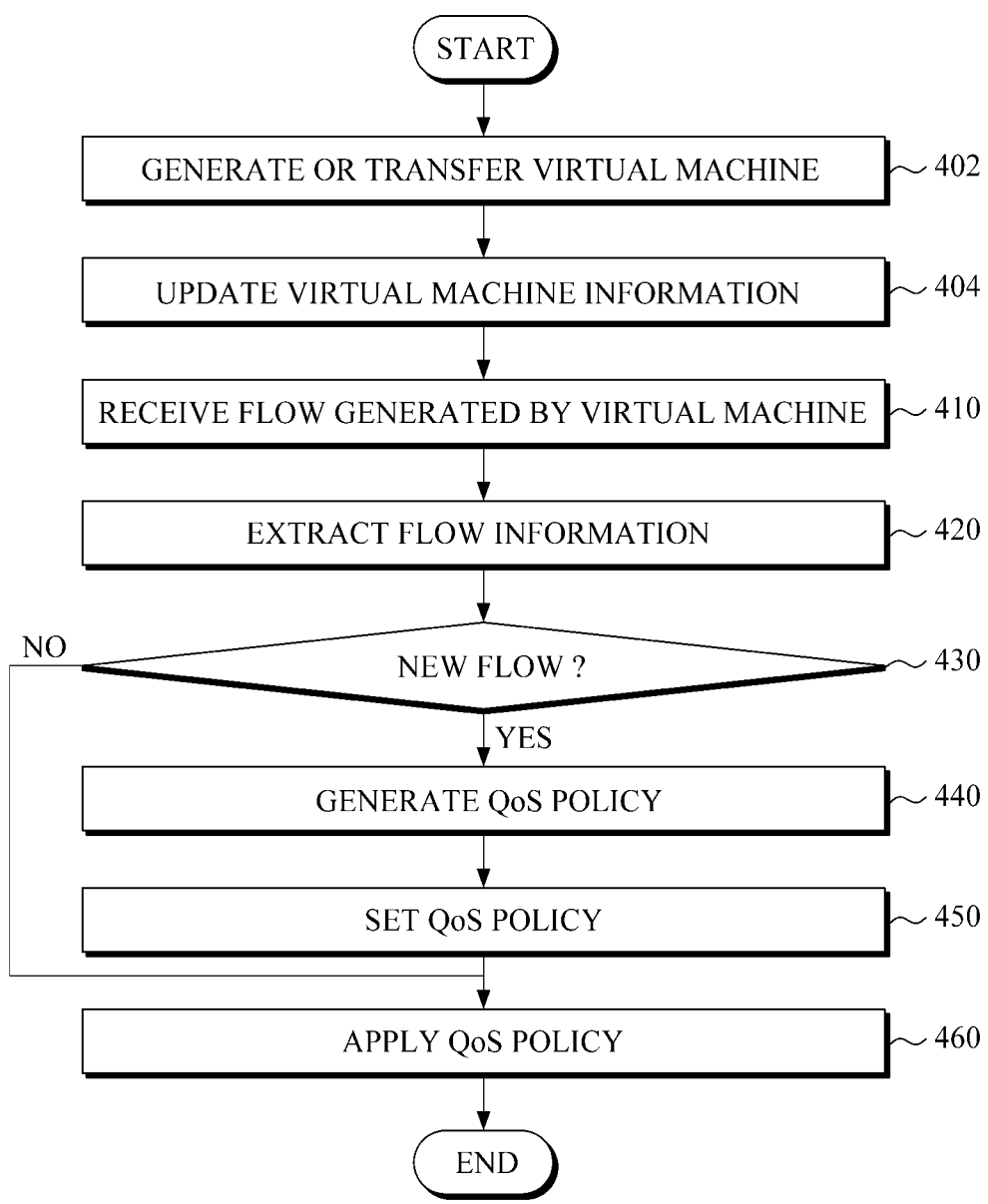
FIG. 4 is a flowchart showing a method for managing a flow in a server virtualization environment in accordance with an example embodiment of the present disclosure.

FIG. 4 is a flowchart showing a method for managing a flow in a server virtualization environment in accordance with an example embodiment of the present disclosure.

Referring to FIG. 4, a method for managing flow in a server virtualization environment includes a first step of receiving flows generated the virtual machines 111a, 112a, 111b and 112b in 410. For example, the flow processing unit 131 may receive flows generated by the virtual machines 111a, 112a, 111b and 112b through the network interface 120a and 120b. Each of the flows generated by the virtual machines 111a, 112a, 111b and 112b has a different Quality of Service (QoS) requirement depending on a service provided by each virtual machine.

Thereafter, flow information is extracted by analyzing the received flow in 420. In this case, the flow information may include protocols, an IP address of departure, a port of departure, an IP address of destination, a port of destination, total bytes, total packets and duration.

Thereafter, it is determined whether the received flow is a new flow or an existing flow based on the extracted flow information in 430. For example, it is determined whether the received flow is a new flow or an existing flow by comparing the extracted is flow information with prestored flow information. In this case, it is determined whether the received flow is a new flow or an existing flow by comparing protocols, an IP address of departure, a port of departure, an IP address of destination, and a port of destination.

If determined in operation 430 that the received flow is a new flow, a QoS policy for the received flow is generated according to a preset QoS generation policy based on the extracted flow information and prestored virtual machine information in 440.

In this case, the QoS generation policy may be dynamically or statically set. For example, a QoS generation policy that is dynamically set may be a QoS generation policy determined based on a user input, or a QoS generation policy determined based on the prestored virtual machine information. A QoS generation policy that is statically set may be a QoS generation policy that is set to equally divide ports and a QoS generation policy that is set to perform a Best Effort (BE). However, the QoS generation policy is not limited thereto.

In addition, the virtual machine information may include an IP address of a virtual machine, an MAC address of a virtual machine, NAT conversion information of a virtual machine, and a QoS requirement for a flow generated by a virtual machine.

Thereafter, the generated QoS policy is set in 450, and the QoS policy is applied to the received flow in 460.

If determined in operation 430 that the received flow is an existing flow, a preset corresponding QoS policy is applied to the received flow in 460.

In accordance with an additional example embodiment of the present disclosure, the method for managing flow in the server virtualization environment may further include transmitting an instruction signal to generate a virtual machine on a server or transfer a virtual machine existing on a server to another server in 402, and updating prestored virtual is machine information by receiving a result of processing the instruction signal and changed virtual machine information from the server in 404.

Figure 5:
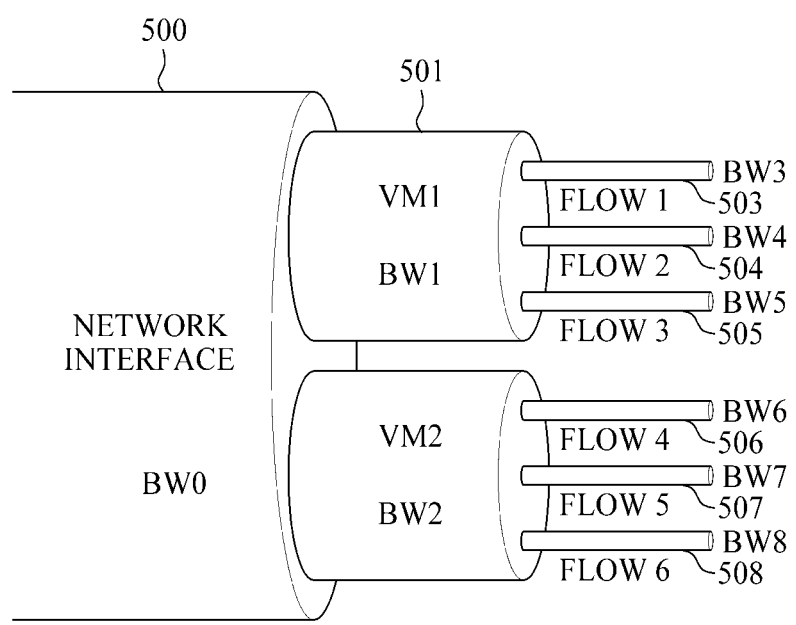
FIG. 5 is a drawing illustrating an example of bandwidth setting values of a network interface, virtual machines and flows generated by the virtual machines in accordance with an example embodiment of the present disclosure.

FIG. 5 is a drawing illustrating a network interface, a virtual machine and a bandwidth setting value of flow generated by a virtual machine in accordance with an example embodiment of the present disclosure.

The flow processing unit 131 may be connected to the servers 110*a* and 110*b* through the one or more interfaces 120*a* and 120*b* (see FIG. 1).

The one or more interfaces 120*a* and 120*b* connected to one server each may have its own bandwidth, and a certain one of the network interfaces may have a bandwidth of BW0 500. In addition, flows 1 to 6 generated by virtual machines VM1 and VM2 in a server may exist in a certain one of the networks, and the virtual machines VM1 and VM2 may have bandwidth setting values BW1 501 and BW2 502, respectively. In addition, the flows 1 to 6 may have bandwidth setting values BW3 to BW8 503 to 508, respectively. In this case, the bandwidth setting value may have an average value or a burst and average value.

Figure 6:
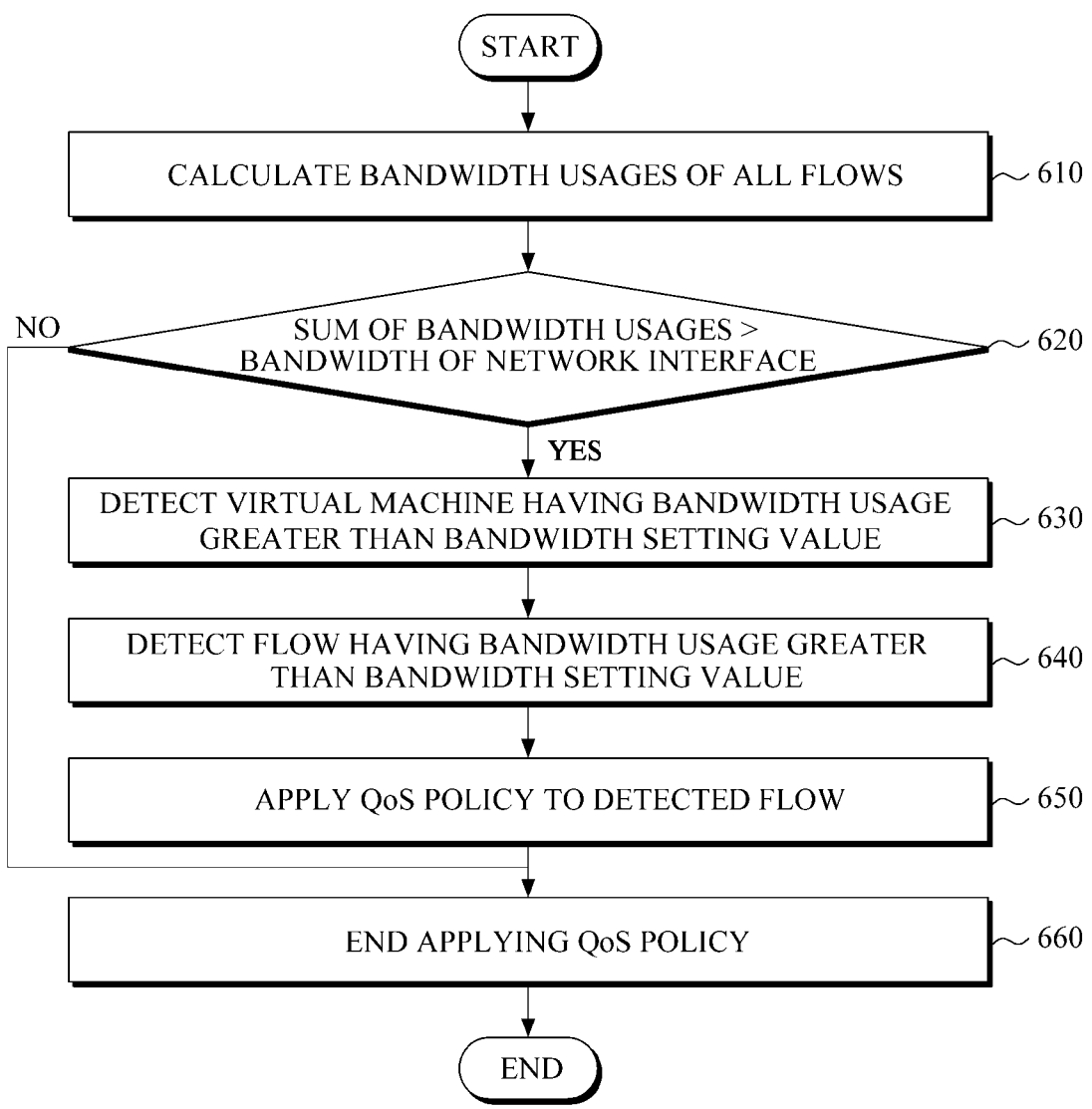
FIG. 6 is a flowchart showing a method for applying a QoS policy to a flow in accordance with an example embodiment of the present disclosure.

FIG. 6 is a flowchart showing a method for applying a QoS policy in accordance with an example embodiment of the present disclosure. Before describing the method for applying a QoS policy, bandwidth usages of the flows 1 to 6 are assumed to be BW3' to BW8', respectively, and bandwidth usages of the virtual machines VM1 and VM2 are assumed to be BW1' and BW2', respectively.

Referring to FIGS. 5 and 6, the method for applying the QoS policy in accordance with an embodiment of the present disclosure first includes calculating bandwidth usages of all flows that are received through a certain network interface and exist in the flow processing unit 131 in 610. The bandwidth usage may have an average value or a burst and average value. For example, bandwidth usages BW3' to BW8' of the flows 1 to 6 existing in the flow processing unit 131 are calculated.

Thereafter, all the calculated bandwidth usages are added up, and a sum of the bandwidth usages is compared with a bandwidth of the certain network interface in 620. For example, the bandwidth usages BW3' to BW8' of the flows 1 to 6 are all added up and compared with the bandwidth BW0 500 of the network interface.

If determined operation 620 that the sum of bandwidth usages of the flows is greater than the bandwidth of the certain network interface, a virtual machine having a bandwidth usage greater than a bandwidth setting value is detected among virtual machines that transmit flows through the certain network interface in 630. For example, if the sum of bandwidth usages BW3' to BW8' is greater than the bandwidth BW0 500 of the network interface, a virtual machine having a bandwidth usage greater than a bandwidth setting value is detected by comparing a bandwidth usage BW1' of the virtual machine VM1 with a corresponding bandwidth setting value BW1 501, and by comparing a bandwidth usage BW2' of the virtual machine VM2 with a corresponding bandwidth setting value BW2 502.

Thereafter, a flow having a bandwidth usage greater than a bandwidth setting value is detected among flows generated by the detected virtual machine in 640. For example, if determined in operation 630 that the virtual machine VM1 is detected, bandwidth usages BW3', BW4' and BW5' of the flows are compared with the bandwidth setting values BW3, BW4 and BW5 503, 504 and 505, respectively, thereby detecting a flow having a bandwidth usage greater than a bandwidth setting value.

Thereafter, a corresponding QoS policy is applied to the detected flow in 650, and the applying of QoS policy ends in 660. For example, if the flow 1 and the flow 2 are detected in operation 604, corresponding QoS policies are applied to the flows 1 and 2, respectively, and the applying of QoS policy ends.

Meanwhile, If determined operation 620 that the sum of bandwidth usages of the flows is equal to or smaller than the bandwidth of the certain network interface, the applying of QoS policy ends in 660.

Figure 7:
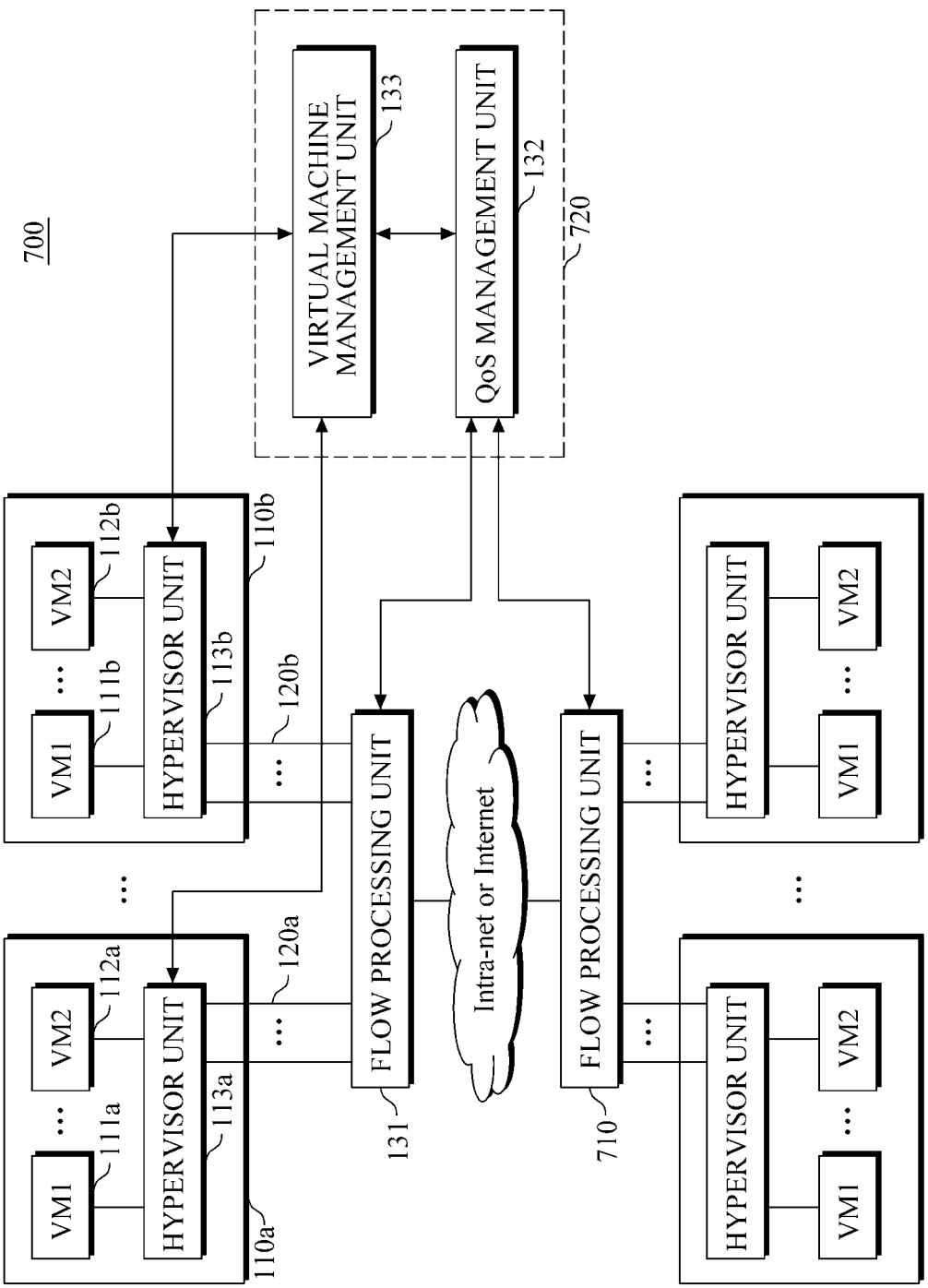
FIG. 7 is a block diagram illustrating a server virtualization system in accordance with another example embodiment of the present disclosure.

FIG. 7 is a block diagram illustrating a server virtualization system in accordance with another example embodiment of the present disclosure.

Referring to FIG. 7, a server virtualization system 700 in accordance with another example embodiment of the present disclosure has the flow processing unit 131, the QoS management unit 132 and the virtual machine management unit 133 of the server virtualization system 100 described with reference to FIG. 1 that are separately formed from one another. In addition, the QoS management unit 132 and the virtual machine management unit 133 may be embodied as a singular apparatus included in a management apparatus 720 separately from the flow processing unit 131. That is, the flow processing unit 131, the QoS management unit 132 and the virtual machine management unit 133 may be logically or physically divided from one another and embodied as individual apparatuses. Alternatively, the QoS management unit 132 and the virtual machine management unit 133 may be incorporated into the management apparatus 720.

In addition, the server virtualization system 700 may further include a flow processing unit 710 connected to multiple servers, and in this case, the connection between the flow processing units 131 and 710 may be achieved through an Intranet or the Internet.

Meanwhile, details of elements of FIG. 7 are the same as those of FIG. 1, and descriptions of the same elements will be omitted.

A number of examples have been described above. Nevertheless, it will be understood that various modifications may be made. For example, suitable results may be is achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for managing a flow in a server virtualization environment, the apparatus comprising:
a receiver which is configured to:
receive a flow generated by a virtual machine implemented in a server; and
a processor which is configured to:
analyze the flow generated by the virtual machine to extract flow information;
determine whether the flow is a new flow by comparing the extracted flow information with preset flow information, and apply a corresponding Quality of Service (QoS) policy to the flow via a flow processing unit;
generate in a case in which the flow is the new flow, the QoS policy for the analyzed flow based on the extracted flow information and prestored virtual machine information, and transmit the generated QoS policy to the flow processing unit via a QoS management unit; and
manage the virtual machine and the prestored virtual machine information via a virtual machine management unit, wherein the virtual machine management unit transmits an instruction signal to the server in which the virtual machine is implemented, and receives, by the apparatus, a result of processing the instruction signal and changed virtual machine information from the server.

2. The apparatus of claim 1, wherein the prestored virtual machine information comprises one of an IP address of the virtual machine, a media access control (MAC) address of the virtual machine, network address translation (NAT) conversion information of the virtual machine, and a QoS requirement for the flow generated by the virtual machine.

3. The apparatus of claim 1, wherein the virtual machine management unit updates the prestored virtual machine information stored in the QoS management unit corresponding to the changed virtual machine information.

4. The apparatus of claim 1, wherein the virtual machine management unit generates the instruction signal to perform one of generation, change, deletion and transfer of the virtual machine.

5. The apparatus of claim 1, wherein the QoS management unit generates the QoS policy for the analyzed flow according to a QoS generation policy that is dynamically set.

6. The apparatus of claim 5, wherein the QoS generation policy that is dynamically set is one of a QoS generation policy that is determined based on a user input, and a QoS generation policy that is determined based on the prestored virtual machine information.

7. The apparatus of claim 1, wherein the QoS management unit generates the QoS policy for the analyzed flow according to a QoS generation policy that is statically set.

8. The apparatus of claim 7, wherein the QoS generation policy that is statically set is one of a QoS generation policy that is set to equally divide ports and a QoS generation policy that is set to perform a Best Effort (BE).

9. A method for managing a flow in a server virtualization environment, the method comprising:
receiving, by an apparatus, a flow generated by a virtual machine implemented in a server;
extracting, by the apparatus, flow information by analyzing the received flow;
determining, by the apparatus, whether the received flow is a new flow by comparing the extracted flow information with prestored flow information;
generating, by the apparatus, if determined that the received flow is a new flow, a QoS policy for the received flow based on the extracted flow information and prestored virtual machine information;
applying, by the apparatus, the generated QoS policy to the received flow, and transmitting an instruction signal to the server in which the virtual machine is implemented; and
receiving, by the apparatus, a result of processing the instruction signal and changed virtual machine information from the server.

10. The method of claim 9, wherein further comprising, if determined that the received flow is not a new flow, applying a preset corresponding QoS policy to the received flow.

11. The method of claim 9, wherein
transmitting the instruction signal to the server is to generate a virtual machine or transfer a virtual machine to another server; and
receiving the result of processing the instruction signal and changed virtual machine information from the server updates the prestored virtual machine information.

12. The method of claim 9, wherein the virtual machine information comprises one of an IP address of the virtual machine, a MAC address of the virtual machine, NAT conversion information of the virtual machine, and a QoS requirement for a flow generated by the virtual machine.

13. The method of claim 9, wherein in the generating of the QoS policy, the QoS policy for the received flow is generated according to a QoS generation policy that is dynamically set.

14. The method of claim 13, wherein the QoS generation policy that is dynamically set is one of a QoS generation policy that is determined based on a user input, and a QoS generation policy that is determined based on the prestored virtual machine information.

15. The method of claim 9, wherein in the generating of the QoS policy, the QoS policy for the received flow is generated according to a QoS generation policy that is statically set.

16. The method of claim 15, wherein the QoS generation policy that is statically set is one of a QoS generation policy that is set to equally divide ports and a QoS generation policy that is set to perform a Best Effort (BE).

17. A method for applying a QoS policy, the method comprising:
calculating, by an apparatus, bandwidth usages of all flows that are received through a network interface and exist in a flow management unit;
adding, by the apparatus, up the calculated bandwidth usages and comparing a sum of the calculated bandwidth usages with a bandwidth of the network interface;
detecting, by the apparatus, if the sum of the bandwidth usages is greater than the bandwidth of the network interface, a virtual machine having a bandwidth usage greater than a bandwidth setting value among virtual machines that transmit the flows through the network interface by comparing bandwidth usages of each of the virtual machines with corresponding bandwidth setting values;
detecting, by the apparatus, a flow having a bandwidth usage greater than a bandwidth setting value among flows generated by the detected virtual machine by comparing bandwidth usages of each flow generated by the detected virtual machine with corresponding bandwidth setting values; and applying, by the apparatus, a corresponding QoS policy to the detected flow.

18. The method of claim 17, further comprising ending the applying of the QoS policy, if the sum of bandwidth usages is equal to or smaller than the bandwidth of the network interface.

* * * * *